United States Patent
Liu et al.

(10) Patent No.: US 10,056,109 B2
(45) Date of Patent: Aug. 21, 2018

(54) SHINGLED MAGNETIC RECORDING WITH OPERATIONAL BASED TRACK SPACING

(71) Applicant: Seagate Technology LLC, Cupertino, CA (US)

(72) Inventors: Xiong Liu, Singapore (SG); Quan Li, Singapore (SG); Kai Yang, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/388,042

(22) Filed: Dec. 22, 2016

(65) Prior Publication Data

US 2018/0182432 A1   Jun. 28, 2018

(51) Int. Cl.
| | |
|---|---|
| *G11B 5/09* | (2006.01) |
| *G11B 20/12* | (2006.01) |
| *G11B 20/18* | (2006.01) |
| *G11B 5/596* | (2006.01) |

(52) U.S. Cl.
CPC ...... *G11B 20/1217* (2013.01); *G11B 5/59633* (2013.01); *G11B 20/1816* (2013.01); *G11B 5/596* (2013.01); *G11B 5/59638* (2013.01); *G11B 5/59644* (2013.01); *G11B 5/59688* (2013.01); *G11B 2020/1218* (2013.01); *G11B 2020/1238* (2013.01)

(58) Field of Classification Search
None
See application file for complete search history.

(56) References Cited

U.S. PATENT DOCUMENTS

| | | | |
|---|---|---|---|
| 6,785,084 B2 | 8/2004 | Szita | |
| 7,154,689 B1 * | 12/2006 | Shepherd | G11B 5/59688 360/48 |
| 7,830,632 B2 | 11/2010 | Tang et al. | |
| 8,179,627 B2 | 5/2012 | Chang et al. | |
| 8,223,458 B2 | 7/2012 | Mochizuki et al. | |
| 8,310,786 B2 | 11/2012 | de la Fuente et al. | |
| 8,832,409 B2 | 9/2014 | Feldman et al. | |
| 8,867,161 B2 | 10/2014 | Emo et al. | |
| 8,913,335 B2 | 12/2014 | Coker et al. | |
| 9,087,540 B1 * | 7/2015 | Lee | G11B 5/59627 |
| 9,281,008 B1 | 3/2016 | Harllee, III et al. | |
| 9,330,688 B1 * | 5/2016 | Zhu | G11B 5/09 |
| 9,349,400 B1 * | 5/2016 | Dhanda | G11B 5/59627 |
| 9,607,633 B1 * | 3/2017 | Toribio | G11B 20/1217 |
| 9,805,752 B2 * | 10/2017 | Yoon | G11B 5/6041 |
| 2012/0176698 A1 * | 7/2012 | Rub | G11B 5/012 360/31 |

(Continued)

*Primary Examiner* — Tan X Dinh
(74) *Attorney, Agent, or Firm* — Hall Estill Attorneys at Law

(57) ABSTRACT

A data storage device can employ shingled magnetic recording with data tracks oriented in order to optimize operational parameters, such as bit error rate. A data storage device can consist of a plurality of data tracks overlapping in a band on a data storage medium. First, second, and third data tracks of the band can be respectively separated by a uniform first track pitch during testing the band for an operational parameter. The first track pitch may then be adjusted to provide at least two different adjusted track pitches with each track pitch measured between longitudinal centerlines of adjacent data tracks of the band.

18 Claims, 4 Drawing Sheets

(56) References Cited

U.S. PATENT DOCUMENTS

| | | | | |
|---|---|---|---|---|
| 2013/0135764 A1* | 5/2013 | Dhanda | ............. | G11B 20/1217 |
| | | | | 360/31 |
| 2013/0335856 A1* | 12/2013 | Tanabe | .................. | G11B 19/04 |
| | | | | 360/76 |
| 2014/0055883 A1* | 2/2014 | Dhanda | .................... | G11B 5/09 |
| | | | | 360/77.08 |
| 2014/0268394 A1* | 9/2014 | Emo | ................. | G11B 20/1217 |
| | | | | 360/48 |

* cited by examiner

SHINGLED MAGNETIC RECORDING WITH OPERATIONAL BASED TRACK SPACING

SUMMARY

A data storage device, in accordance with assorted embodiments, has a plurality of data tracks overlapping in a band on a data storage medium to provide shingled magnetic recording. First, second, and third data tracks of the band are respectively separated by a uniform first track pitch during testing the band for an operational parameter before the first track pitch is adjusted to provide at least two different adjusted track pitches. Each track pitch is measured between longitudinal centerlines of adjacent data tracks of the band.

DETAILED DESCRIPTION

Shingled magnetic recording (SMR) has been proposed to increase the data capacity of a data storage device without increasing the physical size of a data recording medium. By overlapping data tracks, SMR can increase the amount of space on a data recording medium utilized for magnetic data storage. However, the overlapped configuration of data tracks can make data integrity difficult, particularly when random data writes conduct magnetic recording non-uniformly across a data recording medium. Hence, there is a continued industry and consumer goal to optimize data track configuration in an SMR data storage device to increase data capacity without jeopardizing data reliability.

Figure 1:
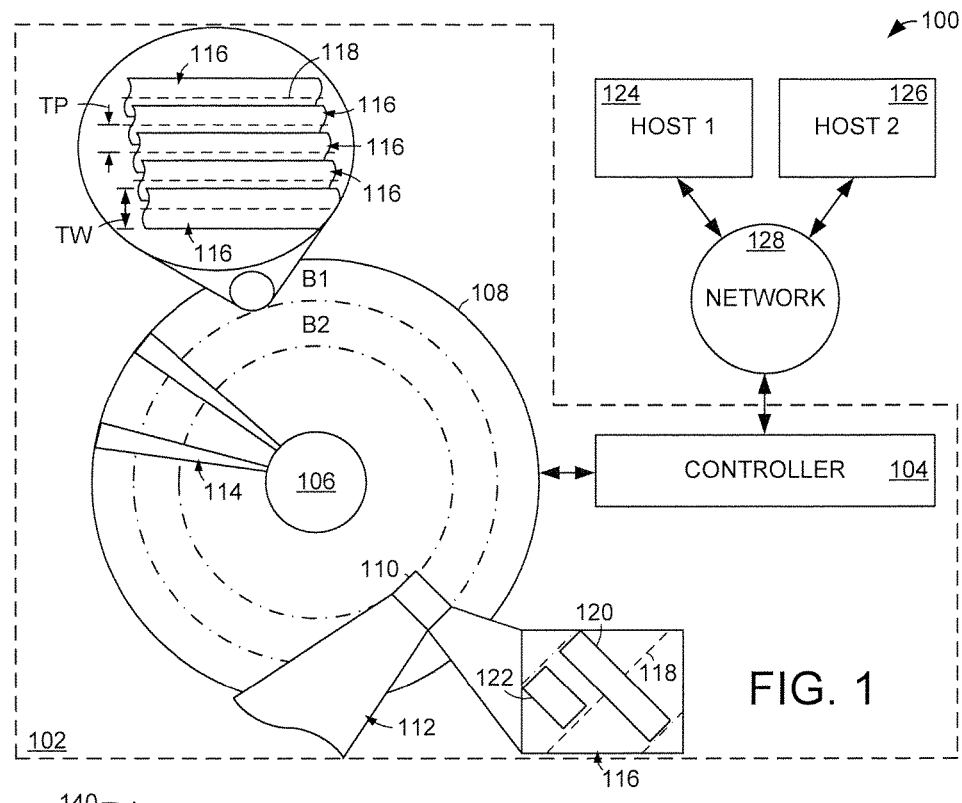
FIG. 1 displays an example data storage system that may be employed in accordance with various embodiments.

Various embodiments can be employed in the example data storage system 100 of FIG. 1. One or more data storage devices 102 can be utilized individually and collectively to provide local and/or remote data storage. It is noted that the system 100 can utilize data storage devices of different types, such as solid state, hybrid, and hard disk drive devices, that have similar, or different, storage capacities and data access speeds. Hence, the data storage system 100 can have multiple different devices with differing data storage characteristics to optimize the storage and transfer of data to, and from, the system 100.

In the example data storage device 102 shown in FIG. 1, a local controller 104, such as a microprocessor, directs operations of a spindle motor 106 to rotate one or more data storage media 108 at a predetermined speed to create an air bearing on which a transducing head 110 floats to access data. The controller 102 may further direct operations of an actuating suspension 112 to move the transducing head 110 over particular bands (B1 & B2) of the data storage medium 108 so that data can be accessed. Movement of the transducing head 110 can be influenced by servo data positioned in servo bursts 114 throughout the data storage medium 108. Servo data is to be understood as non-user data that enables data accesses, such a grey code, error correction, position error sensing, and data track gates.

It is contemplated that the data storage medium 108 contain a plurality of similar, or dissimilar bands (B1/B2) that each contain a plurality of data tracks 116 where magnetic data bits are stored. As shown, data tracks 116 can be overlapped to provide SMR. Each data track 116 has a longitudinal track centerline 118, which may match the writing centerline. The shingled orientation of the assorted data tracks 116 in a band can be characterized by the track pitch (TP), which is measured by the distance between adjacent track centerlines 118. It is noted that the track pitch can be different than the writer width (WW), which is the magnetic extent of a data writer 120 portion of the transducing head 110.

While the overlapping, shingled configuration of the data tracks 116 can increase the amount of data stored on the data storage medium 108, the precision of data reading and writing is emphasized. To read data from shingled data tracks 116, a data reader 122 can be positioned offset relative to the data writer 120 in order to detect uncovered magnetic data bits of a particular data track 116. Although not required, the position of the data reader 122 can be to one side of, and potentially separated from, the track centerline 118 in order to read data stored on only one shingled data track 116. Hence, the reader can be offset from the track centerline 118 by a reader offset distance.

The ability to direct data access activity in the data storage device 102 locally with the controller 104 allows stand-alone operation. However, the local controller 104 can be complemented, or replaced, by one or more remote hosts 124 and 126 that are connected to the data storage device 102 via a wired, or wireless, network 128. As a non-limiting example, a first remote host 124 can be a supplemental processor that conducts data transfer and maintenance operations concurrently with the local controller 104 and a second remote host 126 is a network node that can be selectively utilized for temporary, or permanent data storage.

Figure 2:
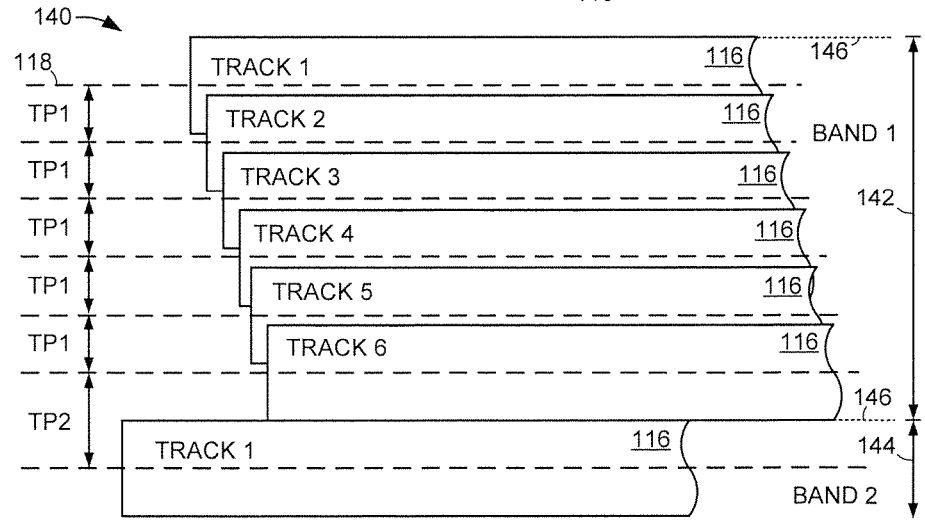
FIG. 2 is a line representation of an example portion of data storage medium arranged in accordance with some embodiments.

FIG. 2 illustrates a top view line representation of a portion of an example data storage medium 130 that may be employed in the data storage system 100 of FIG. 1 in accordance with some embodiments. The data storage medium 140 has at least a first band 142 and a second band 144 each arranged with a plurality of data tracks 116 oriented with a uniform track pitch (TP1). It is contemplated that the data tracks 116 of adjacent bands 142/144 may have a greater track pitch, such as TP2, which may be characterized as a physical gap between track 6 of the first band 142 and track 1 of the second band 144 called a guard track or guard band.

In order to increase SMR device data capacity, there are no random write operations within an SMR band. Thus, a writing operation for a given SMR band sequentially writes data, such as from track 1 to track 30. However, random write access can be conducted between different SMR bands. By applying the same track pitch to all the data tracks 116 of the first band 142, the bit error rate (BER) of each data track 116 is approximately the same after a band write. A band write is understood as a sequential writing of each track 116 of a band 142 with new, or existing data. However, modern data storage device operation often results in data writing to random data bands 142. It is contemplated that some data tracks 116 will experience greater BER with random data band writes due to the position of the track 116 in the band 142. For instance, tracks proximal an edge 146 of the band 142 may experience greater data loss, and higher BER, as a result of random band writes recording data to less than all the tracks 116 of the band 142. Therefore, the overall data capacity, and areal data capability (ADC), of a data storage device 102 may be restricted by the BER of data tracks as a result of random data band writes.

Figure 3:
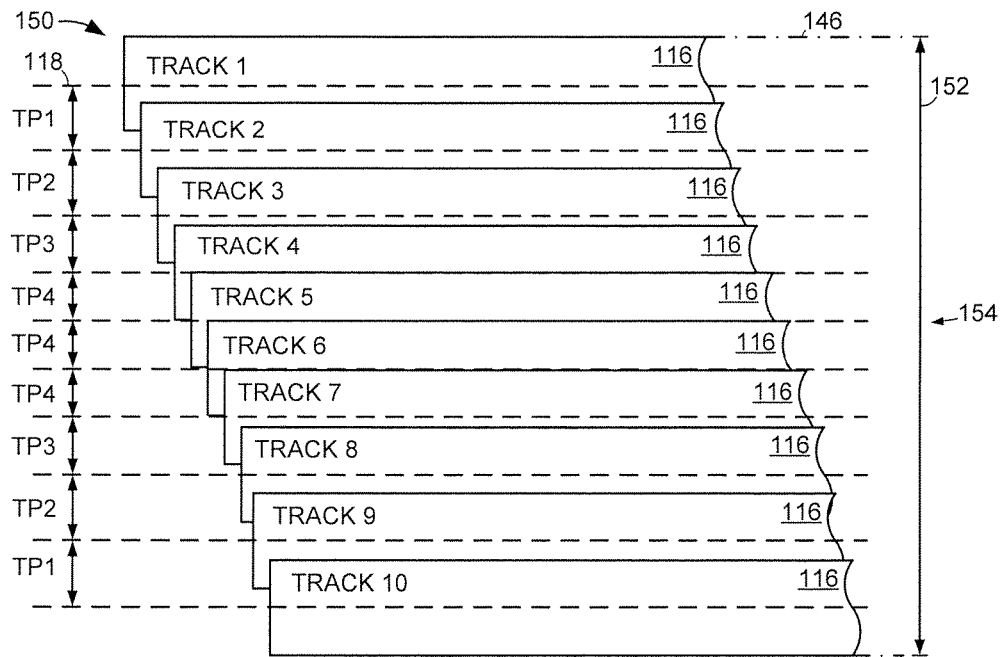
FIG. 3 depicts a line representation of an example portion of a data storage medium capable of being used in the data storage system of FIG. 1.

FIG. 3 depicts a top view line representation of an example data band 150 that can be implemented on the data storage medium 108 of FIG. 1 in accordance with assorted embodiments. The band 150 has a plurality of data tracks 116 that collectively occupy a band width 152 on a data storage medium 108. As a result of testing the band 150 for at least one operational parameter, such as BER, data writing time, data reading time, and adjacent track interference (ATI), a local, or remote, controller 104 can alter the orientation of the respective data tracks 116 to provide more than one track pitch. That is, a data storage medium can be initially configured with a single, uniform track pitch (TP1) that is subsequently altered by a controller to multiple different track pitches to optimize data access performance in view of the tested operational parameter(s).

For example, operational parameter(s) can be tested by writing, and subsequently reading, one or more test patterns to some, or all, of the data tracks in the band 150 and the controller 104 can alter a uniform band track pitch to varying track pitches to mitigate the effects of uniform track pitch on data storage performance. Although not required or limiting, operational parameters of data tracks 116 proximal the edge 146 of the band 150 can experience greater degradation due to random adjacent band writes than tracks 116 near the band center 154. Hence, the controller 104 can adjust the data tracks 116, as shown, to have a relatively large track pitch (TP1) proximal the band edges 146 and a relatively small track pitch (TP4) proximal the band center 154 to reduce the degradation of data storage performance due to random data band writes.

While any number and orientation of track pitches can be incorporated between the outside data tracks (Tracks 1/2/9/10) and the inside data tracks (Tracks 5/6), some embodiments gradually decrease the track pitches from TP1 to TP4 with pitches TP2 and TP3, as shown in FIG. 3. Other embodiments can increase track pitch dimensions, provide greater than four adjusted track pitches, and abruptly change track pitches between data tracks 116 to decrease performance degradation associated with random data writes to the band 150.

For clarity, it is noted that TP1>TP2>TP3>TP4, the data tracks 116 each have a common track width, and the track pitches are each measured between track centerlines 118 of adjacent data tracks 116. Through the adjustment of track pitches directed by the controller 104 that resulted in the configuration of FIG. 3, the original uniform track pitch that existed between each data track 116 was altered. However, an original, uniform track pitch size may be kept between one or more adjacent data tracks 116 of a band 150.

Figure 4:
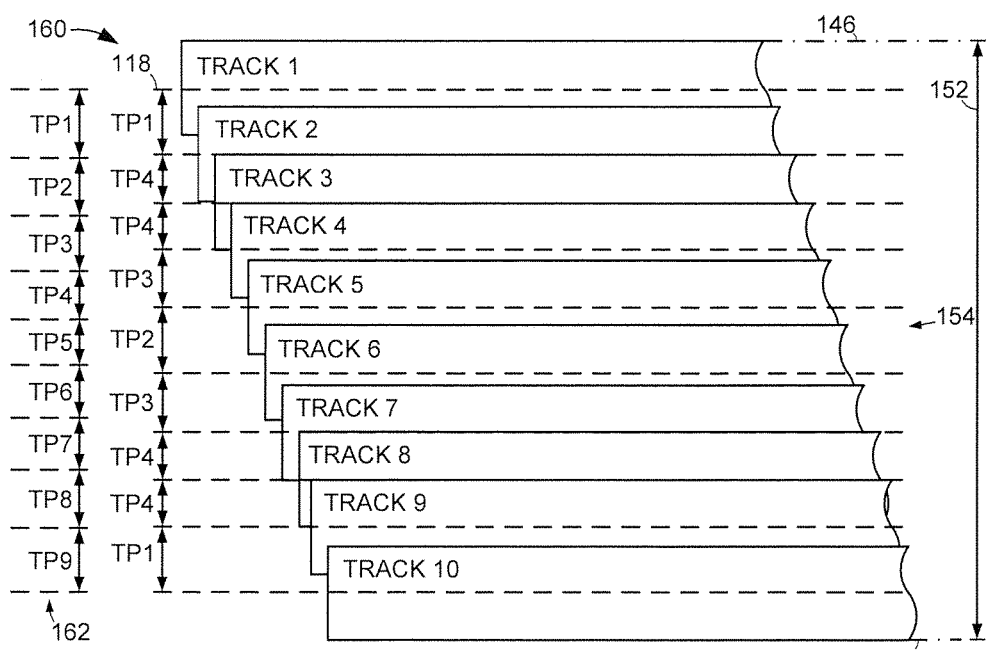
FIG. 4 conveys a line representation of an example portion of a data storage medium employed by the data storage system of FIG. 1.

With the gradual decreasing progression of track pitches in FIG. 3 towards the band center 154, data storage performance can be more reliable as magnetic data writing is less likely to inadvertently erase or alter data resident on adjacent data tracks 116. FIG. 4 is a top view line representation of another example data storage band 160 that can be resident on a data storage medium 108 of a data storage system 100. As a result of band testing, a controller 104 can adjust the location and size of track pitches to mitigate the degradation of stored data due to random data writes.

As illustrated in FIG. 4, the track pitch (TP1) of the outside data tracks (Tracks 1/10) are relaxed while a tighter track pitch (TP4) is present between Tracks 2-3, 3-4, 7-8, and 8-9. In comparison to the gradual decrease of track pitch towards the band center 154 in band 150, band 160 abruptly goes from the widest track pitches (TP1) to the smallest track pitches (TP4) and then to increased pitches (TP3 and TP2) towards the band center 154. As with the track pitches of band 150, TP1>TP2>TP3>TP4 and the overall band width 152 is the same, despite different track pitch configurations.

The ability to customize the position of the assorted data tracks 116, as measured by the varying track pitches, allows a controller 102 to respond to fabrication and operational variations in a data storage device 102 to provide increased data storage performance over the life of the device and the occurrence of countless numbers of random data writes to a data band. In some embodiments, each track pitch of the data band is different with the track pitches proximal the band edges 146 being wider than the track pitches proximal the band center 154, as illustrated by exemplary pitches 162.

In general, the wider a track pitch, better BER performance is experienced due to BER being a function of track pitch with track pitch measured on a micrometer or nanometer scale. For a given data storage device, a unit of track pitch can be measured in servo digital-to-analog converter (DAC), such as 256 servo DAC per track pitch. With a data storage medium being divided into different zones, such as 100 zones from the outer medium diameter to the inner medium diameter, that each have many SMR bands, track pitch can be tested and adjusted band-by-band. However, such testing and adjustment would take far too long and not provide much difference for a given zone. Thus, various embodiments test a single band in each zone and utilize the non-uniform adjusted track pitches for that band for all the bands in the given zone, and perhaps other bands of other zones.

Figure 5:
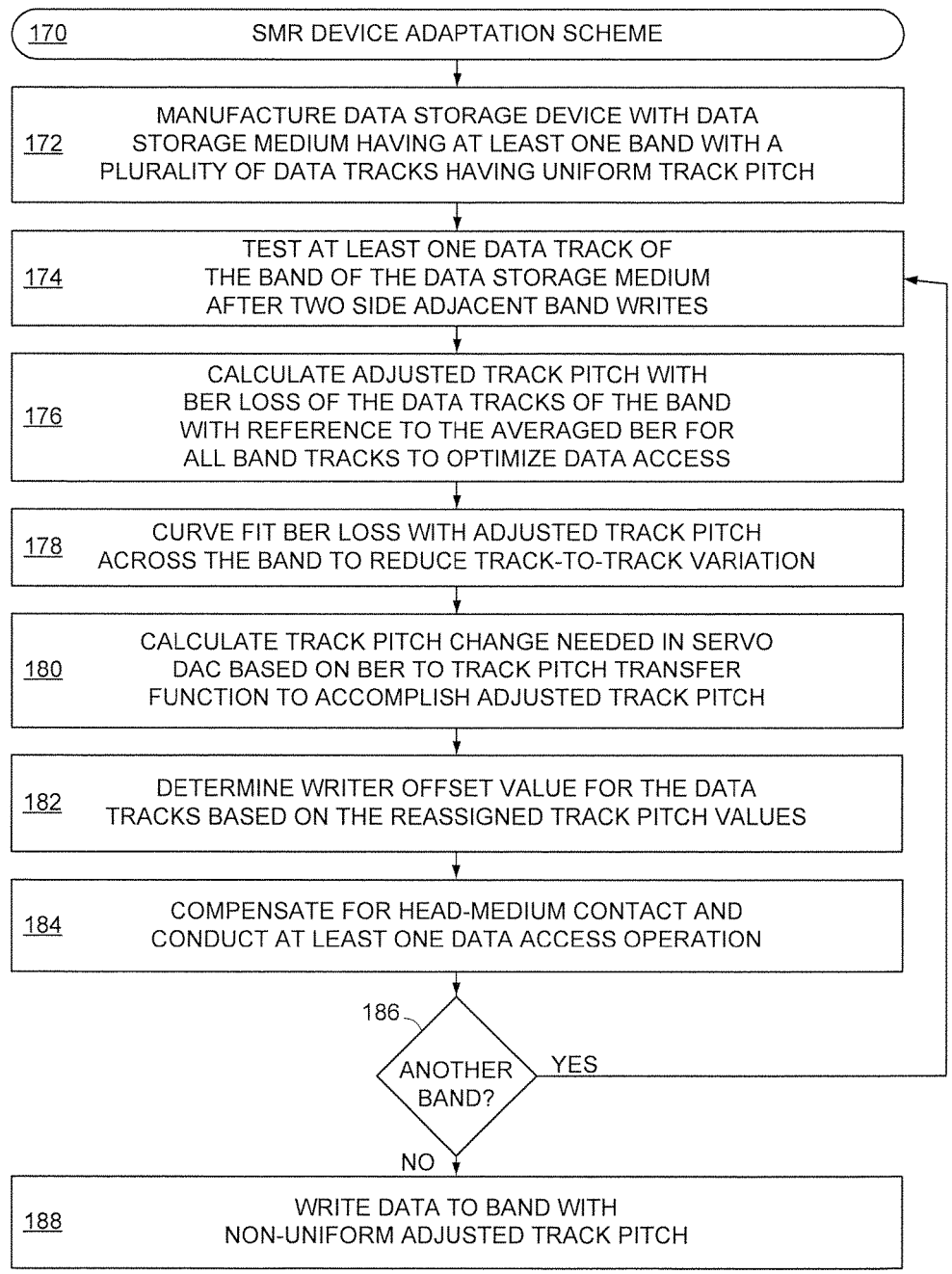
FIG. 5 provides an example track spacing adaptation routine that may be executed by the data storage system of FIG. 1.

FIG. 5 is an example SMR device fabrication routine 170 that may be conducted in accordance with various embodiments to proactively compensate for the effects of random data writes on shingled data tracks. The routine 170 begins by manufacturing a data storage device with at least one data storage medium having at least one data band consisting of a plurality of data tracks having a uniform track pitch. During manufacturing, the data storage device can be fabricated, constructed, and assembled into a unitary device ready to be installed in a computing device and subsequently store user data.

It is contemplated that various tests can be conducted with non-user data during, and after, the manufacturing process. One such test can be executed in step 174 where at least one data track of the data band has non-user, test data written to the band prior to the data being read. Step 174 can be conducted with a test stand during manufacturing, after the data storage device has been fully assembled, or after the device has been utilized by an end-user to store user data to the data storage media. In some embodiments, step 174 conducts multiple tests for a diverse variety of operating parameters, such as BER, thermal asperities, and repeatable runout. Regardless of the number and type of test conducted in step 174, a local, or remote, controller can generate a performance profile for at least a portion of a data band and perhaps numerous different data bands of the assorted data storage media of the data storage device.

The performance profile generated from step 174 allows the controller to determine which data tracks, and data bands, are more susceptible to errors and failures associated with random access writes. For instance, the test of step 174 can compile BER loss for a data track after data is written on immediately adjacent SMR bands, such as via band writes from opposite sides of the tested data track. The identification of data tracks with high BER loss after writes from one, or both opposite sides, of the tested track allows a controller in step 176 to calculate one or more adjusted track pitches for the various data tracks of the data band to optimize data access without increasing the overall band width, such as width 152 shown in FIGS. 3-4.

The adjustment of track pitches based solely on tested performance, such as BER, can produce relatively large changes in track pitch within a data band, which can lead to considerable variation in track-to-track performance. Hence, step 178 proceeds to curve fit the adjusted track pitches to reduce track-to-track measurement variations due to write-to-write, read-to-read, position error signal, etc. in at least one data band. The curve utilized in step 178 is not limited and can be linear, curvilinear, parabolic, standard deviation, simple average, or moving average, which produces an alteration of at least one adjusted track pitch, which can be characterized as a final adjusted track pitch.

Step 180 then calculates track pitch changes needed in terms of servo DAC based on the BER to track pitch transfer function. As a result, the final adjusted track pitch can be provided in servo DAC that allows step 180 to determine the physical writer offset needed to narrow, or enlarge, the track pitches of the various data tracks. That is, the servo data that produced the uniform track pitches in step 172 are evaluated in step 180 and respectively changed in step 182 to provide non-uniform track pitches that conform to the final adjusted track pitches from step 178. The adjustment of servo data in step 182 can be actually written in the servo regions of a data storage medium or be accomplished virtually by a device controller via a writer offset value that results in data tracks overlapping in a non-uniform manner within a data band.

Next, step 184 conducts data access operations, such as writing user or test data to a data track with an adjusted track pitch, with compensations being made for head-medium contact, such as via a heater positioned in the transducing head. As such, data access operations can concurrently adjust lateral head position via adjusted track pitch and vertical head position via a heater to conduct SMR. It is noted that step 184 may be executed with one or more test patterns, which may be the same, or different, than the test data written in step 174, to verify that random SMR band writes are less likely to result in error and failures than the uniform track pitch configuration logged in step 174.

While a single data band of a data storage device can be tested and adjusted with scheme 170, decision 186 evaluates if additional data bands are to be tested. If so, step 174 is revisited for a different data band. In some embodiments, revisiting step 174 after decision 186 results in a second data band having a different track pitch, and data track, configuration. The ability to produce two or more different data bands with different track pitch configurations, such as different numbers of track pitches and/or different track pitch locations within a band, allows a data storage medium to have different band customized to the as-manufactured performance of the head-media assembly.

Figure 6:
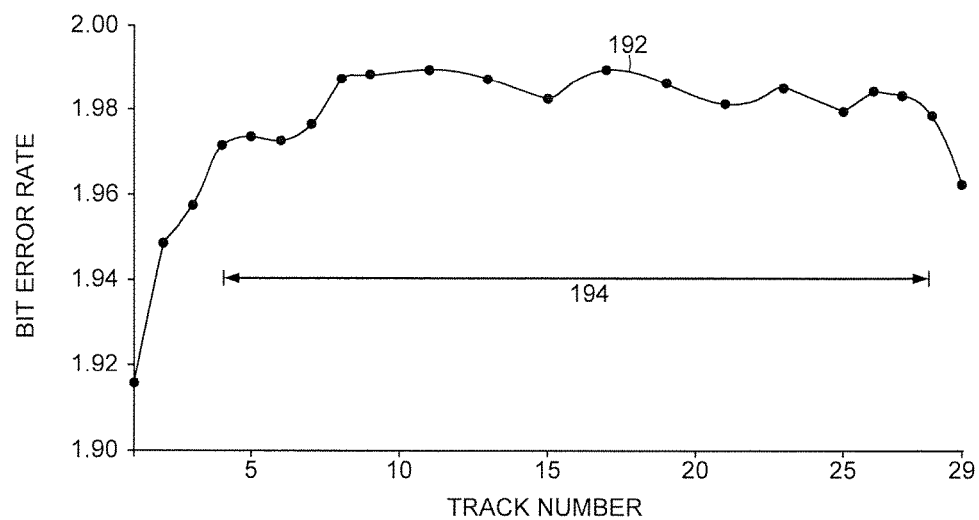
FIG. 6 plots operational data for an example data storage medium arranged in accordance with various embodiments.

If no additional data bands are to be tested, decision 186 advances to step 188 where the adjusted data band(s) are released for general use, which is expected to involve writing of user data to the data bands as part of a SMR device. As a result of scheme 170, the performance of various data tracks of a data band can be different before and after data is written to the data band as part of an SMR device. FIG. 6 graphs the bit error rate performance of assorted data tracks of a data band with a uniform track pitches after writing data to two adjacent track bands. Solid line 192 conveys how the BER of shingled data tracks varies depending on location within a data band. That is, data tracks at the periphery of the data band (Tracks 0-5 & 25-29) have lower BER than the tracks proximal the middle of the band, as represented by region 194. The lower BER after numerous writes to each track of the band, such as 256 writes, determines the overall areal data capability of the data surface, and consequently the data storage device.

Figure 7:
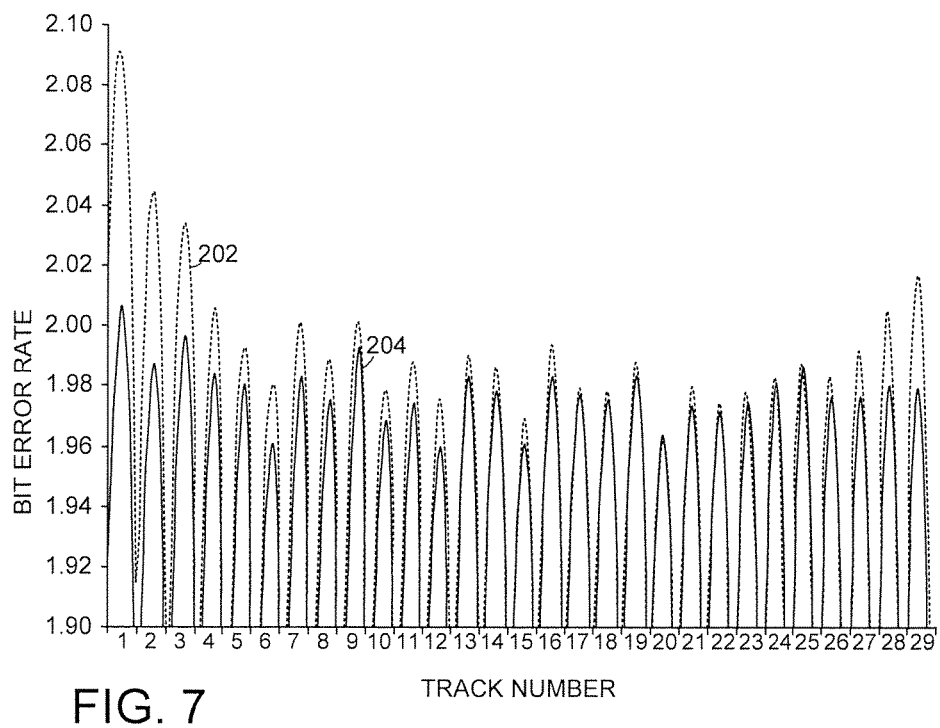
FIG. 7 graphs operational data before and after track pitch adjustment in accordance with some embodiments.

FIG. 7 plots how altering the uniform track pitches of a data band via scheme 170 can provide an overall greater areal data capability for a data storage device. Segmented lines 202 represent the BER for various data tracks for different data reader offset values before adjacent track writes. Solid line 204 corresponds with BER for the data tracks after a number of adjacent band writes, such as 256 writes to each data track. It is noted that the data of FIG. 7 is for data tracks with adjusted, non-uniform track pitches, which produce a purposely boosted BER in some data tracks prior to SMR writes to the data band, as shown by tracks 1-4 and 27-29.

However, after writing data to adjacent SMR bands, the BER of all the tracks of a test band are relatively close, such as within 0.05 BER. In comparison with the lowest BER (1.92) of the band employing uniform track pitches (FIG. 6), the adjusted, non-uniform track pitches of FIG. 7 increase BER by roughly 0.04 BER, which can be considered an overall areal data capability gain as reliability of data accesses is increased without physically positioning more writable data space on a data storage medium. Thus, by applying different track pitches for data tracks in an data band, the data tracks can be optimized to reduce to reduce the risk of errors and failures as a result of SMR band writes.

Through the alteration of uniform SMR track pitches with regard to tested track performance, manufacturing and structural variations for a head-media assembly can be compensated to provide a data band that is more robust. The ability to narrow or enlarge various data tracks in a band without increasing the overall band width allows tracks that are more susceptible to adjacent SMR band writes to have larger track pitches and tracks that experience less errors as a result of adjacent SMR band writes to have smaller track pitches, as illustrated by FIGS. 3 and 4. The overall increase in reliability of the data tracks effectively provides an increase in areal data capability compared to bands with uniform track pitches.

In general, the various embodiments of non-uniform track pitches in a data band can increase data storage device areal data capability (ADC). In a data band with a uniform track pitch, there are 256 servo DAC between tracks. In an optimized data band in accordance with assorted embodiments of the present disclosure, the track pitches around a middle band track has a smaller track pitch defined by less servo DAC. With reference to FIGS. 3-4, TP1 may be 264 servo DAC while current reliability threshold is 256 servo DAC, which results in a difference of 8 servo DAC, which is a ADC gain, while the tracks in the middle of the band can be reduced by 8 servo DAC without any loss in data writing reliability. As such, the 8 servo DAC reduction for each track can be converted to ADC gain by dividing the aggregate of the 8 servo DAC reduction by each reduced track, such as 8×29 (29 of 30 tracks in the band) by the aggregate of 256 servo DAC for all tracks, such as 256×30.

It is to be understood that even though numerous characteristics and advantages of various embodiments of the present disclosure have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
arranging a plurality of data tracks in a first band on a data storage medium to overlap and provide shingled magnetic recording, first, second, and third data tracks of the first band respectively separated by a uniform first track pitch;
testing the first band for bit error rate;
adjusting the first track pitch to provide at least two different adjusted track pitches to decrease the bit error rate of at least one of the plurality of data tracks, each track pitch measured between longitudinal centerlines of adjacent data tracks of the first band; and
altering the at least two different adjusted track pitches to at least two different final adjusted track pitches to fit each adjusted track pitch to a curve, the at least two different final adjusted track pitches having reduced track-to-track measurement variations within the first band compared to the at least two different adjusted track pitches.

2. The method of claim 1, wherein the first track pitch is adjusted to provide different second, third, and fourth track pitches.

3. The method of claim 1, wherein a second band of the data storage medium has multiple data tracks oriented with third and fourth track pitches each selected in response to the tested bit error rate.

4. The method of claim 1, wherein the longitudinal centerline of each data track matches a write centerline.

5. The method of claim 1, wherein the first track pitch is larger than the second track pitch, the first track pitch located proximal an edge of the first band.

6. The method of claim 5, wherein the second track pitch is positioned approximately at a center of the first band.

7. The method of claim 1, wherein the first track pitch is smaller than the second track pitch, the first track pitch located proximal an edge of the first band, the second track pitch located distal the edge of the first band.

8. The method of claim 1, wherein the first band comprises at least three different track pitches.

9. The method of claim 8, wherein the at least three different track pitches gradually decrease from a first edge of the first band to a centerline of the first band.

10. The method of claim 2, wherein the second track pitch is larger than the first track pitch and the third track pitch is smaller than the first track pitch.

11. The method of claim 2, wherein the fourth track pitch is smaller than the first, second, or third track pitch, the fourth track pitch positioned in a center of the first band.

12. The method of claim 1, wherein the at least two different track pitches are fit to a parabolic curve.

13. The method of claim 1, wherein a second band on the data storage medium initially has a plurality of data tracks respectively separated by the uniform first track pitch that are adjusted into at least three different adjusted track pitches to lower the bit error rate of at least two data tracks of the second band.

14. The method of claim 13, wherein the adjusted track pitches of the first band are different than the adjusted track pitches of the second band.

15. The method of claim 1, wherein the bit error rate of at least one data track of the first band increase and the bit error rate of at least two data tracks of the first band decrease as a result of the adjusting step.

16. A method comprising:
arranging a plurality of data tracks in a first band on a data storage medium to overlap and provide shingled magnetic recording, first, second, and third data tracks of the first band respectively separated by a uniform first track pitch as defined by servo data stored on the data storage medium;
testing the first band for bit error rate;
adjusting the first track pitch to provide at least two different adjusted track pitches to decrease the bit error rate of at least one of the plurality of data tracks, each track pitch measured between longitudinal centerlines of adjacent data tracks of the first band; and
altering the at least two different adjusted track pitches to at least two different final adjusted track pitches to fit each adjusted track pitch to a standard deviation curve, the at least two different final adjusted track pitches having reduced track-to-track measurement variations within the first band compared to the at least two different adjusted track pitches.

17. The method of claim 16, wherein the first track pitch is adjusted by assigning an offset value to the servo data for the respective data tracks of the first band.

18. The method of claim 16, wherein a second band of data tracks on the data storage medium is adjusted from the first track pitch to provide at least three adjusted different track pitches, the adjusted track pitches of the first band being different than the adjusted track pitches of the second band.

* * * * *